US012099777B2

(12) United States Patent
Liu

(10) Patent No.: US 12,099,777 B2
(45) Date of Patent: Sep. 24, 2024

(54) AUDIO PLAYBACK DEVICE CAPABLE OF COOPERATING WITH PLURAL AUDIO GENERATING DEVICES WITHOUT CONDUCTING BLUETOOTH PAIRING PROCEDURE AND RELATED BLUETOOTH AUDIO SYSTEM

(71) Applicant: Realtek Semiconductor Corp., Hsinchu (TW)

(72) Inventor: Yu Hsuan Liu, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 227 days.

(21) Appl. No.: 17/972,101

(22) Filed: Oct. 24, 2022

(65) Prior Publication Data

US 2023/0137317 A1  May 4, 2023

Related U.S. Application Data

(60) Provisional application No. 63/273,156, filed on Oct. 29, 2021.

(51) Int. Cl.
  *G06F 3/16* (2006.01)
  *H04R 3/00* (2006.01)
  *H04W 12/55* (2021.01)

(52) U.S. Cl.
  CPC ............ *G06F 3/165* (2013.01); *H04R 3/00* (2013.01)

(58) Field of Classification Search
  CPC ........... G06F 3/165; H04R 3/00; H04W 12/55
  USPC .................................. 381/2, 1, 307, 300, 26
  See application file for complete search history.

(56) References Cited

U.S. PATENT DOCUMENTS

2016/0359925 A1  12/2016  Song
2019/0028803 A1*  1/2019  Benattar ................. H04S 7/304

OTHER PUBLICATIONS

Taiwanese Office Action and Search Report for Taiwanese Application No. 111140297, dated Aug. 31, 2023, with English translation.
Taiwanese Notice of Allowance for Taiwanese Application No. 111140297, dated Nov. 30, 2023, with an English translation.

* cited by examiner

*Primary Examiner* — Thjuan K Addy
(74) *Attorney, Agent, or Firm* — Birch, Stewart, Kolasch & Birch, LLP

(57) ABSTRACT

A Bluetooth audio system includes: an audio playback device arranged to operably generate and transmit Bluetooth audio transmission parameters; a first audio generating device arranged to operably capture sound to generate first audio packets, to operably receive the Bluetooth audio transmission parameters without conducting Bluetooth pairing with the audio playback device, and to operably broadcast the first audio packets through BIS logical transport; and a second audio generating device arranged to operably capture sound to generate second audio packets, to operably receive the Bluetooth audio transmission parameters without conducting Bluetooth pairing with the audio playback device, and to operably broadcast the second audio packets through BIS logical transport. the audio playback device is further arranged to operably receive the first audio packets and the second audio packets broadcasted by the first audio generating device and the second audio generating device, and to operably generate and playback corresponding sound signals.

12 Claims, 2 Drawing Sheets

AUDIO PLAYBACK DEVICE CAPABLE OF COOPERATING WITH PLURAL AUDIO GENERATING DEVICES WITHOUT CONDUCTING BLUETOOTH PAIRING PROCEDURE AND RELATED BLUETOOTH AUDIO SYSTEM

CROSS-REFERENCE TO RELATED APPLICATIONS

This application claims the benefit of priority to U.S. Provisional Application Ser. No. 63/273,156, filed on Oct. 29, 2021; the entirety of which is incorporated herein by reference for all purposes.

BACKGROUND

The disclosure generally relates to Bluetooth technologies and, more particularly, to an audio playback device capable of cooperating with plural audio generating devices without conducting Bluetooth pairing procedure with the audio generating devices, and related Bluetooth audio systems.

A speaker and plural separate microphone devices can form a Bluetooth audio system (e.g., a Bluetooth conference system, a Bluetooth video conference system, a Bluetooth karaoke system, a Bluetooth smart speaker system, etc.) by realizing the wireless transmission of audio signals between the speaker and the microphone devices with Bluetooth communication technology. However, there are many limitations in the use of traditional Bluetooth audio systems. For example, before using the traditional Bluetooth audio system, the user has to first perform a Bluetooth pairing procedure on the speaker and all the microphone devices one by one, so that the microphone devices can transmit audio signals to the speaker by using the Bluetooth transmission mechanism.

As is well known in the art, the user usually has to spend a lot of time to complete the manual Bluetooth pairing procedure between different devices. Additionally, the greater the number of microphone devices in the Bluetooth audio system, the longer the Bluetooth pairing procedure will take. Therefore, if the audio transmission mechanism adopted by the Bluetooth audio system cannot be changed, the operational convenience and application prospect of the Bluetooth audio system will inevitably be limited.

SUMMARY

An example embodiment of a Bluetooth audio system is disclosed, comprising: an audio playback device comprising: an audio processing circuit arranged to operably control an audio playback circuit; a control circuit coupled with the audio processing circuit and arranged to operably generate one or more Bluetooth audio transmission parameters corresponding to an audio broadcasting timing indicator; and a Bluetooth communication circuit coupled with the control circuit and arranged to operably transmit the one or more Bluetooth audio transmission parameters; a first audio generating device comprising: a first sound capturing circuit arranged to operably capture surrounding sounds to generate a corresponding first audio signal; a first audio conversion circuit coupled with the first sound capturing circuit and arranged to operably generate corresponding one or more first audio packets according to the first audio signal; and a first Bluetooth transmission circuit coupled with the first audio conversion circuit and arranged to operably receive the one or more Bluetooth audio transmission parameters when the first audio generating device without conducting Bluetooth pairing with the audio playback device, and arranged to operably broadcast the one or more first audio packets through a BIS logical transport; and a second audio generating device comprising: a second sound capturing circuit arranged to operably capture surrounding sounds to generate a corresponding second audio signal; a second audio conversion circuit coupled with the second sound capturing circuit and arranged to operably generate corresponding one or more second audio packets according to the second audio signal; and a second Bluetooth transmission circuit coupled with the second audio conversion circuit and arranged to operably receive the one or more Bluetooth audio transmission parameters when the second audio generating device without conducting Bluetooth pairing with the audio playback device, and arranged to operably broadcast the one or more second audio packets through a BIS logical transport; wherein the Bluetooth communication circuit is further arranged to operably receive the one or more first audio packets broadcasted by the first audio generating device, and to operably receive the one or more second audio packets broadcasted by the second audio generating device; wherein the audio processing circuit is further arranged to operably generate a corresponding sound signal according to contents of the one or more first audio packets and the one or more second audio packets, and to operably control the audio playback circuit to playback the sound signal.

Another example embodiment of an audio playback device of a Bluetooth audio system is disclosed. The Bluetooth audio system comprising a first audio generating device and a second audio generating device. The audio playback device comprises: an audio processing circuit arranged to operably control an audio playback circuit; a control circuit coupled with the audio processing circuit and arranged to operably generate one or more Bluetooth audio transmission parameters corresponding to an audio broadcasting timing indicator; and a Bluetooth communication circuit coupled with the control circuit and arranged to operably transmit the one or more Bluetooth audio transmission parameters; wherein the first audio generating device captures surrounding sounds to generate a corresponding first audio signal, generates corresponding one or more first audio packets according to the first audio signal, and receives the one or more Bluetooth audio transmission parameters when the first audio generating device without conducting Bluetooth pairing with the audio playback device, and broadcasts the one or more first audio packets through a BIS logical transport; wherein the second audio generating device captures surrounding sounds to generate a corresponding second audio signal, generates corresponding one or more second audio packets according to the second audio signal, and receives the one or more Bluetooth audio transmission parameters when the second audio generating device without conducting Bluetooth pairing with the audio playback device, and broadcasts the one or more second audio packets through a BIS logical transport; wherein the Bluetooth communication circuit is further arranged to operably receive the one or more first audio packets broadcasted by the first audio generating device, and to operably receive the one or more second audio packets broadcasted by the second audio generating device; wherein the audio processing circuit is further arranged to operably generate a corresponding sound signal according to contents of the one or more first audio packets and the one or more second audio packets, and to operably control the audio playback circuit to playback the sound signal.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
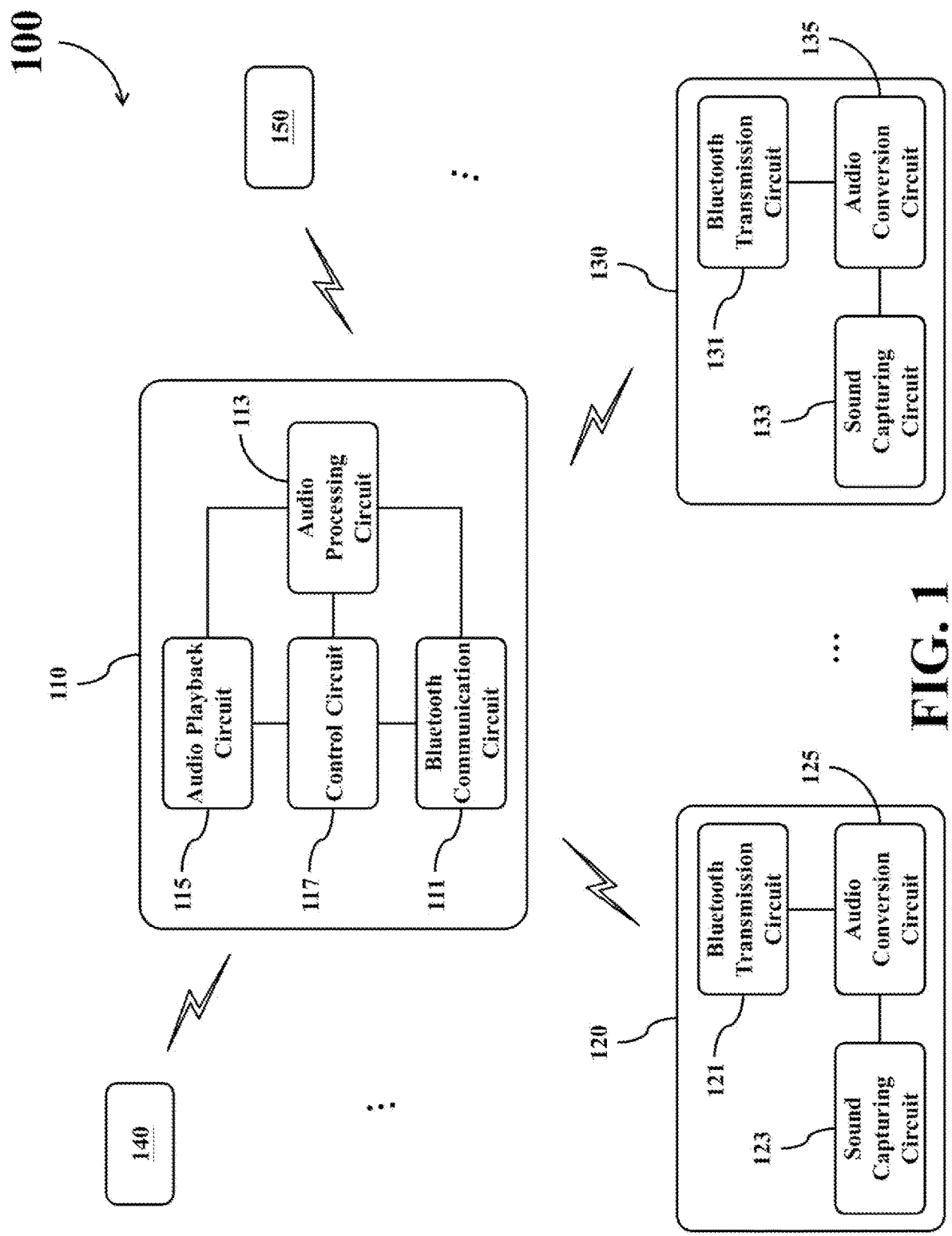
FIG. 1 shows a simplified functional block diagram of a Bluetooth audio system according to one embodiment of the present disclosure.

FIG. 1 shows a simplified functional block diagram of a Bluetooth audio system 100 according to one embodiment of the present disclosure. The Bluetooth audio system 100 comprises an audio playback device 110 and a plurality of audio generating devices. For the convenience of description, four exemplary audio generating devices are shown in the embodiment if FIG. 1, which respectively are a first audio generating device 120, a second audio generating device 130, a third audio generating device 140, and a fourth audio generating device 150.

The first audio generating device 120, the second audio generating device 130, the third audio generating device 140, and the fourth audio generating device 150 are respectively utilized to capture surrounding sounds to generate corresponding audio packets, and may adopt Bluetooth LE Audio technology (hereinafter referred to as BLE Audio technology) specified by the Bluetooth Core Specification Version 5.2 or newer versions to broadcast the generated audio packets.

The audio playback device 110 supports the BLE technology specified by the Bluetooth Core Specification Version 5.2 or newer versions, and may receive the audio packets broadcasted by the first audio generating device 120, the second audio generating device 130, the third audio generating device 140, and the fourth audio generating device 150. In addition, the audio playback device 110 may generate and playback corresponding sounds based on the received audio packets.

As shown in FIG. 1 所, the audio playback device 110 comprises a Bluetooth communication circuit 111, an audio processing circuit 113, an audio playback circuit 115, and a control circuit 117. The first audio generating device 120 comprises a first Bluetooth transmission circuit 121, a first sound capturing circuit 123, and a first audio conversion circuit 125. The second audio generating device 130 comprises a second Bluetooth transmission circuit 131, a second sound capturing circuit 133, and a second audio conversion circuit 135.

In the audio playback device 110, the Bluetooth communication circuit 111 is arranged to operably receive and transmit various Bluetooth packets. The audio processing circuit 113 is coupled with the Bluetooth communication circuit 111 and the audio playback circuit 115, and arranged to operably generate audio contents to be playbacked by the audio playback circuit 115. The control circuit 117 is coupled with the Bluetooth communication circuit 111, the audio processing circuit 113, and the audio playback circuit 115, and is arranged to operably control the operations of the Bluetooth communication circuit 111, the audio processing circuit 113, and the audio playback circuit 115.

In practice, the Bluetooth communication circuit 111 may be realized with appropriate Bluetooth transmission circuits supporting the Bluetooth communication protocol of the Bluetooth Core Specification Version 5.2 or a newer version. The audio processing circuit 113 may be realized with digital computing circuits, microprocessors, Application Specific Integrated Circuits (ASICs), or digital-to-analog converters (DACs) capable of conducting various encoding/decoding processing and/or data format conversion on the audio data. The audio playback circuit 115 may be realized with various appropriate circuits capable of receiving and playbacking the audio data, such as various mono speakers or multi-channel speakers. The control circuit 117 may be realized with various packet processing circuits, digital computing circuits, microprocessors, or ASICs having appropriate computing ability and capable of parsing and generating Bluetooth packets.

In some embodiments, the aforementioned Bluetooth communication circuit 111 may be realized with appropriate Bluetooth transmission circuits that also support the Bluetooth communication protocol of earlier Bluetooth versions (e.g., Bluetooth 2.0, Bluetooth 3.0, Bluetooth 4.0, Bluetooth 4.2, or the like). In this situation, the aforementioned control circuit 117 should be designed to be able to parse and generate Bluetooth packets defined by the Bluetooth communication protocol of earlier Bluetooth versions.

Different functional blocks of the aforementioned audio playback device 110 may be realized with separate circuits or may be integrated into a single Bluetooth controller IC or a single device. In some embodiments, for example, the aforementioned audio processing circuit 113 may be integrated into the aforementioned control circuit 117. In other words, the audio processing circuit 113 and the control circuit 117 may be realized with separate circuits or may be realized with a same circuit. In addition, if necessary, the Bluetooth communication circuit 111 may be coupled with additional antenna devices (not shown in the figures).

In practical applications, all functional blocks of the audio playback device 110 may be integrated together to be various appropriate devices or systems that support the Bluetooth communication protocol of the Bluetooth Core Specification Version 5.2 or a newer version, and capable of receiving audio data broadcasted by other devices using the BLE Audio technology, such as a Bluetooth speaker, a Bluetooth smart speaker, an audio playback device, a desktop computer, a notebook computer, a tablet computer, a mobile communication device (e.g., a smart phone), a wearable device, or the like.

In the first audio generating device 120, the first Bluetooth transmission circuit 121 is arranged to operably receive and parse various Bluetooth packets, and to operably generate and transmit various Bluetooth packets. The first sound capturing circuit 123 is arranged to operably capture surrounding sounds to generate corresponding audio signals. The first audio conversion circuit 125 is coupled with the first Bluetooth transmission circuit 121 and the first sound capturing circuit 123, and arranged to operably process the audio signals generated by the first sound capturing circuit 123 (e.g., encoding the audio signals and/or conducting format conversion) to generate corresponding audio packets. In addition, the first audio conversion circuit 125 is further arranged to operably utilize the first Bluetooth transmission circuit 121 to broadcast the generated audio packets.

In the second audio generating device 130, the second Bluetooth transmission circuit 131 is arranged to operably receive and parse various Bluetooth packets, and to operably generate and transmit various Bluetooth packets. The second sound capturing circuit 133 is arranged to operably capture surrounding sounds to generate corresponding audio signals. The second audio conversion circuit 135 is coupled with the second Bluetooth transmission circuit 131 and the second sound capturing circuit 133, and arranged to operably process the audio signals generated by the second sound capturing circuit 133 (e.g., encoding the audio signals and/or conducting format conversion) to generate corresponding audio packets. In addition, the second audio conversion circuit 135 is further arranged to operably utilize the second Bluetooth transmission circuit 131 to broadcast the generated audio packets.

In practice, each of the aforementioned first Bluetooth transmission circuit 121 and second Bluetooth transmission circuit 131 may be realized with appropriate Bluetooth transmission circuits supporting the Bluetooth communication protocol of the Bluetooth Core Specification Version 5.2 or a newer version, and capable of parsing and generating Bluetooth packets. Each of the aforementioned first sound capturing circuit 123 and the second sound capturing circuit 133 may be realized with various appropriate circuits capable of capturing and converting surrounding sounds into corresponding audio signals, such as various types of microphones. Each of the aforementioned first audio conversion circuit 125 and the second audio conversion circuit 135 may be realized with a digital computing circuit, a microprocessor, an Application Specific Integrated Circuit (ASIC), or a digital-to-analog converter (DAC) capable of conducting various encoding processing and/or data format conversion on audio signals.

In some embodiments, each of the aforementioned first Bluetooth transmission circuit 121 and second Bluetooth transmission circuit 131 may be realized with appropriate Bluetooth transmission circuits that also support the Bluetooth communication protocol of earlier Bluetooth versions (e.g., Bluetooth 2.0, Bluetooth 3.0, Bluetooth 4.0, Bluetooth 4.2, or the like). In this situation, each of the first Bluetooth transmission circuit 121 and the second Bluetooth transmission circuit 131 should be designed to be able to parse and generate Bluetooth packets defined by the Bluetooth communication protocol of earlier Bluetooth versions.

Furthermore, different functional blocks of the aforementioned first Bluetooth transmission circuit 121 may be realized with separate circuits or may be integrated into a single Bluetooth controller IC or a single device (e.g., a Bluetooth earphone, a Bluetooth speaker, a desktop computer, a notebook computer, a tablet computer, a mobile communication device, a wearable Bluetooth device, etc.). In addition, if necessary, the first Bluetooth transmission circuit 121 may be coupled with additional antenna devices (not shown in the figures). Similarly, different functional blocks of the aforementioned second Bluetooth transmission circuit 131 may be realized with separate circuits or may be integrated into a single Bluetooth controller IC or a single device (e.g., a Bluetooth earphone, a Bluetooth speaker, a desktop computer, a notebook computer, a tablet computer, a mobile communication device, a wearable Bluetooth device, etc.). In addition, if necessary, the second Bluetooth transmission circuit 131 may be coupled with additional antenna devices (not shown in the figures).

In some embodiments, the aforementioned first audio conversion circuit 125 and second audio conversion circuit 135 may be respectively integrated into the aforementioned first Bluetooth transmission circuit 121 and second Bluetooth transmission circuit 131.

In other words, the aforementioned first audio conversion circuit 125 and first Bluetooth transmission circuit 121 may be realized with separate circuits or may be realized with a same circuit. Similarly, the aforementioned second audio conversion circuit 135 and second Bluetooth transmission circuit 131 may be realized with separate circuits or may be realized with a same circuit.

The main circuit structure and implementation of other audio generating devices in the Bluetooth audio system 100 (e.g., the third audio generating device 140 and the fourth audio generating device 150) are similar to the aforementioned first audio generating device 120 or second audio generating device 130, but different additional circuit components may be configured in different audio generating devices, and the circuit structure of all audio generating devices are not limited to be exactly identical.

It can be appreciated from the foregoing descriptions that the structure of the Bluetooth audio system 100 can be utilized to implement various audio systems that support the Bluetooth communication protocol of the Bluetooth core specification version 5.2 or a newer version, and capable of playbacking sounds captured by different audio generating devices, such as a multi-user Bluetooth conference system, a multi-user Bluetooth video conference system, a multi-user Bluetooth karaoke system, a multi-person teaching system, a Bluetooth smart speaker system, a multi-user real-time voice communication system, a vehicular audio system, or the like.

As described previously, there are many limitations in the use of traditional Bluetooth audio systems. For example, before using the traditional Bluetooth audio system, the user has to first perform a Bluetooth pairing procedure on the speaker and all the microphone devices one by one, so that the microphone devices can transmit audio signals to the speaker by using the Bluetooth transmission mechanism. As one can imagine, it will take a lot of time for the user to complete the manual Bluetooth pairing procedure between all the microphone devices and the speaker. Furthermore, the greater the number of microphone devices in the Bluetooth audio system, the more time the user will spend in the Bluetooth pairing procedure.

In order to solve the aforementioned shortcomings in the use of the traditional Bluetooth audio system, the disclosed Bluetooth audio system 100 will adopt a different approach to realize the audio transmission mechanism between individual audio generating device and the audio playback device 110.

Figure 2:
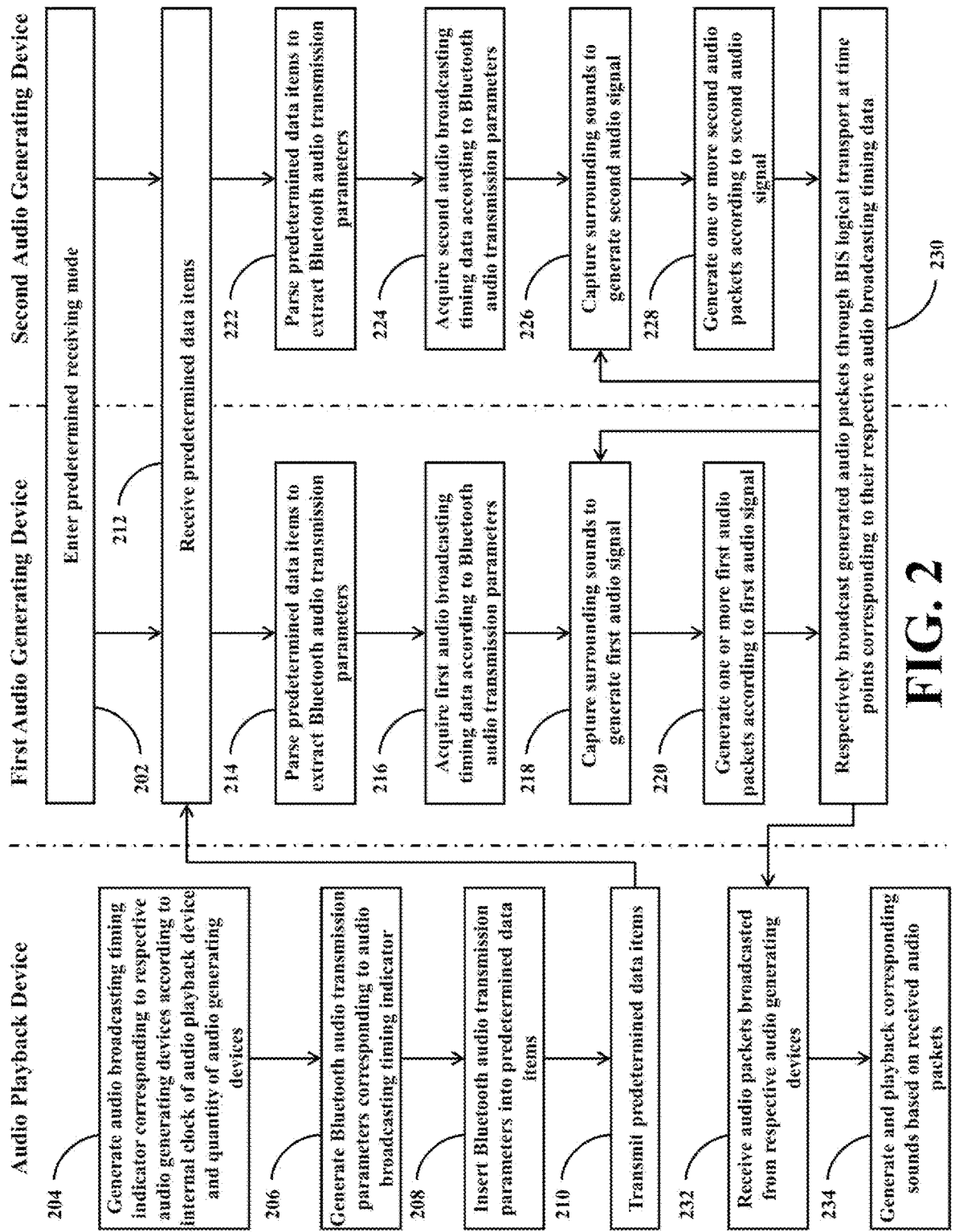
FIG. 2 shows a simplified flowchart of a method for generating and playbacking Bluetooth audio signals according to another embodiment of the present disclosure.

The operations of the Bluetooth audio system 100 will be further described below by reference to FIG. 2. FIG. 2 shows a simplified flowchart of a method for generating and playbacking Bluetooth audio signals according to another embodiment of the present disclosure.

In the flowchart of FIG. 2, operations within a column under the name of a specific device are operations to be performed by the specific device. For example, operations within a column under the label "audio playback device" are operations to be performed by the audio playback device 110; operations within a column under the label "first audio generating device" are operations to be performed by the first audio generating device 120; operations within a column under the label "second audio generating device" are operations to be performed by the second audio generating device 130.

A user may utilize the audio playback device 110 to playback the sounds captured by some audio generating devices in the Bluetooth audio system 100, so as to utilize the Bluetooth audio system 100 to realize various specific applications, such as a multi-user Bluetooth conference system, a multi-user Bluetooth video conference system, a multi-user Bluetooth karaoke system, a multi-person teaching system, a Bluetooth smart speaker system, a multi-user real-time voice communication system, a vehicular audio system, or the like. For ease of understanding, the method of FIG. 2 will be elaborated below by taking a scenario where the audio playback device 110 is utilized to playback the sounds captured by the first audio generating device 120 and the second audio generating device 130 as an example.

When the user wants to use the audio playback device 110 to playback the sounds captured by the first audio generating device 120 and the second audio generating device 130 in real time, the first audio generating device 120 and the second audio generating device 130 may perform the operation 202 of FIG. 2 according to a specific manipulation conducted by the user (e.g., pressing a power-on switch, pressing a specific function key, issuing a specific voice command, or issuing a specific command in various suitable ways).

In the operation 202, the first Bluetooth transmission circuit 121 of the first audio generating device 120 and the second Bluetooth transmission circuit 131 of the second audio generating device 130 may enter a predetermined receiving mode.

The aforementioned predetermined receiving mode refers to various operation modes capable of receiving various Bluetooth advertising packets, various Broadcast Isochronous Stream (BIS) protocol data units (PDUs) (hereinafter referred to as BIS PDUs), and/or various Broadcast Isochronous Group (BIG) protocol data units (hereinafter referred to as BIG PDUs).

For example, the aforementioned predetermined receiving mode may be a LE Extended Passive Scan mode, a LE Extended Active Scan mode, a LE Extended Initiator mode, or a Periodic Scanning mode capable of receiving various Bluetooth advertising packets.

For another example, the aforementioned predetermined receiving mode may be an operation mode capable of receiving various PDUs through a Broadcast Isochronous Stream (BIS) logical transport (hereinafter referred to as BIS logical transport) and/or receiving various PDUs through a Broadcast Isochronous Group logical transport (hereinafter referred to as BIG logical transport), such as a Periodic Synchronization mode, a BIG Synchronization mode, or the like. Alternatively, the aforementioned predetermined receiving mode may be a combination of the aforementioned various operation modes.

On the other hand, the audio playback device 110 may enter a predetermined transmitting mode according to a specific manipulation of the user (e.g., pressing a specific button, issuing a specific voice command, or issuing a specific command in various suitable ways). The aforementioned predetermined transmitting mode refers to various operation modes capable of transmitting various Bluetooth advertising packets, various BIS PDUs, and/or various BIG PDUs.

For example, the aforementioned predetermined transmitting mode may be an Advertising mode, a Scannable mode, a Connectable mode, a Non-connectable mode, a Non-Scannable mode, a Periodic Advertising mode, a LE Extended Advertising mode, or a LE Periodic Advertising mode. For another example, the aforementioned predetermined transmitting mode may be a Broadcast Isochronous Broadcasting mode or a Broadcast Isochronous Synchronization mode capable of transmitting various BIS PDUs through the BIS logical transport and/or transmitting various BIG PDUs through the BIG logical transport. Alternatively, the aforementioned predetermined transmitting mode may be a combination of the aforementioned various operation modes.

In the operation 204, the control circuit 117 may generate an audio broadcasting timing indicator corresponding to respective audio generating devices according to an internal clock CLK_INT of the audio playback device 110 and a quantity of audio generating devices to be cooperated with the audio playback device 110. In operations, the control circuit 117 may divide each reception period of the Bluetooth communication circuit 111 into a corresponding quantity of time segments according to the quantity of audio generating devices to be cooperated with the audio playback device 110, and then generate an audio broadcasting timing indicator that can be used to indicate the corresponding timing relationship between individual audio generating device and individual time segment.

In practice, the quantity of audio generating devices to be cooperated with the audio playback device 110 may be pre-recorded in a non-volatile memory or firmware inside the audio playback device 110 by the manufacturer or the vender of the audio playback device 110. Alternatively, the quantity of audio generating devices to be cooperated with the audio playback device 110 may be inputted to the audio playback device 110 by the user through a suitable input interface (not shown in the figures) before using the audio playback device 110, so that the control circuit 117 can obtain the quantity of audio generating devices to be cooperated with the audio playback device 110.

In this embodiment, for example, the audio generating device to be cooperated with the audio playback device 110 are the first audio generating device 120 and the second audio generating device 130. Accordingly, the control circuit 117 may divide each reception period of the Bluetooth communication circuit 111 into an even number of time segments, and assign these time segments to the first audio generating device 120 and the second audio generating device 130 respectively. Then, the control circuit 117 may express the timing relationship between the first audio generating device 120 and the second audio generating device 130 and respective time segments in various suitable data formats as an audio broadcasting timing indicator, so that the audio broadcasting timing indicator can be utilized to indicate which time segments correspond to the first audio generating device 120 and which time segments correspond to the second audio generating device 130. In practice, the control circuit 117 may use a specific count value corresponding to a specific edge of the internal clock CLK_INT to indicate the start time point of a certain time segment, so that different time segments correspond to different count values respectively.

For example, the control circuit 117 may divide each reception period of the Bluetooth communication circuit 111 into four time segments, six time segments, eight time segments, ten time segments, or other even number of time segments. The control circuit 117 may assign odd-numbered time segments among the time segments to the first audio generating device 120, and assign even-numbered time segments among the time segments to the second audio generating device 130. The control circuit 117 may express the corresponding relationship between the first audio generating device 120 and the odd-numbered time segments (e.g., the mapping relationship between the first audio generating device 120 and a certain set of count values) and the corresponding relationship between the first audio generating device 120 and the even-numbered time segments (e.g., the mapping relationship between the first audio generating device 120 and another set of count values) in various suitable data formats to be an audio broadcasting timing indicator.

If the quantity of audio generating devices to be cooperated with the audio playback device 110 is four, then the control circuit 117 may divide each reception period of the Bluetooth communication circuit 111 into N time segments, and assign the N time segments to the four audio generating devices, wherein N is 4 or a multiple of 4. Then, the control circuit 117 may express the corresponding relationship between the four audio generating devices and respective time segments (e.g., the mapping relationship between individual audio generating device and related count values) in various suitable data formats to be an audio broadcasting timing indicator. As a result, the audio broadcasting timing indicator can be used to indicate the corresponding relationship between respective time segments and respective audio generating devices.

From another aspect, the aforementioned audio broadcasting timing indicator not only can be used to indicate which time segments correspond to which audio generation device, but also can be used to indicate the timing relationship among the operations of different audio generating devices (or the operating order of different audio generating devices).

In the operation 206, the control circuit 117 may generate one or more Bluetooth audio transmission parameters corresponding to the aforementioned audio broadcasting timing indicator. For example, the control circuit 117 may utilize various appropriate data format to represent a predetermined indication data, a BIS interval calculated based on the quantity of audio generating devices to be cooperated with the audio playback device 110, and the broadcasting timing corresponding to respective audio generating devices (e.g., the corresponding relationship between the identification data of respective audio generating devices and specific count values), so as to generate one or more Bluetooth audio transmission parameters corresponding to the aforementioned audio broadcasting timing indicator.

The aforementioned predetermined indication data may be a hardware identification data corresponding to the audio playback device 110, a manufacturer identification data corresponding to the manufacturer of the audio playback device 110, an operating mode indication data corresponding to a specific operating mode, and/or a function identification data corresponding to a specific function supported by the audio playback device 110.

In some embodiments, the control circuit 117 may further allocate corresponding bandwidths for different audio generating devices respectively, and incorporate the bandwidths allocated to respective audio generating devices into the aforementioned one or more Bluetooth audio transmission parameters.

It can be appreciated from the descriptions of the operation 204 and the operation 206, the broadcasting timing of respective audio generating devices to be cooperated with the audio playback device 110, and the broadcast sequence among different audio generating devices are determined by the audio playback device 110 rather than by the individual audio generating devices.

In the operation 208, the control circuit 117 may insert the aforementioned one or more Bluetooth audio transmission parameters into one or more predetermined data items. In operations, the control circuit 117 may insert the aforementioned one or more Bluetooth audio transmission parameters into a single or multiple specific fields of a single predetermined data item, or may separately insert the one or more Bluetooth audio transmission parameters into the specific fields of multiple predetermined data items.

For example, in some embodiments where the aforementioned predetermined data items are various Bluetooth advertising packets, the control circuit 117 may insert the aforementioned one or more Bluetooth audio transmission parameters into a single or multiple specific fields of a single Bluetooth advertising packet. Alternatively, the control circuit 117 may insert the aforementioned one or more Bluetooth audio transmission parameters into specific fields of multiple Bluetooth advertising packets.

For another example, in some embodiments where the aforementioned predetermined data items are various BIS PDUs or BIG PDUs, the control circuit 117 may insert the aforementioned one or more Bluetooth audio transmission parameters into a single or multiple specific fields of a single BIS PDU or a single or multiple specific fields of a single BIG PDU, or may alternatively insert the aforementioned one or more Bluetooth audio transmission parameters into specific fields of multiple BIS PDUs or multiple BIG PDUs. In practice, the aforementioned specific fields may be Event Counter fields, Sub-Event Counter fields, Payload Counter fields, or the like in the BIS PDUs or the BIG PDUs.

In the operation 210, the control circuit 117 may transmit the aforementioned one or more predetermined data items through the Bluetooth communication circuit 111 under the predetermined transmitting mode, so that the first audio generating device 120, the second audio generating device 130, and other Bluetooth devices (e.g., the aforementioned third audio generating device 140 and fourth audio generating device 150) within the Bluetooth signal transmission range of the audio playback device 110 can receive the aforementioned one or more predetermined data items.

For example, in some embodiments where the aforementioned predetermined transmitting mode is the Scannable mode, the Connectable mode, the Non-connectable mode, or the Non-Scannable mode, the one or more predetermined data items indicated in the aforementioned operation 208 and operation 210 may be one or more auxiliary advertising indication (AUX_ADV_IND) packets. Alternatively, the one or more predetermined data items indicated in the aforementioned operation 208 and operation 210 may be a group of packets formed by one or more extended advertising indication (ADV_EXT_IND) packets and one or more auxiliary advertising indication (AUX_ADV_IND) packets. Alternatively, the one or more predetermined data items indicated in the aforementioned operation 208 and operation 210 may be a group of packets formed by one or more advertising decision indication (ADV_DECISION_IND) packets, and one or more auxiliary advertising indication (AUX_ADV_IND) packets.

In this situation, if the aforementioned predetermined receiving mode is the LE Extended Passive Scan mode, the LE Extended Active Scan mode, or the LE Extended Initiator mode, then the first Bluetooth transmission circuit 121 and the second Bluetooth transmission circuit 131 may perform the operation 212 to receive the one or more predetermined data items transmitted from the audio playback device 110.

For another example, in some embodiments where the aforementioned predetermined transmitting mode is the Non-connectable mode or the Non-Scannable mode, the one or more predetermined data items indicated in the aforementioned operation 208 and operation 210 may be one or more auxiliary chain indication (AUX_CHAIN_IND) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, and one or more auxiliary chain indication (AUX_CHAIN_IND) packets.

In this situation, if the aforementioned predetermined receiving mode is the LE Extended Passive Scan mode, then the first Bluetooth transmission circuit 121 and the second Bluetooth transmission circuit 131 may perform the operation 212 to receive the one or more predetermined data items transmitted from the audio playback device 110.

For yet another example, in some embodiments where the aforementioned predetermined transmitting mode is the Scannable mode, the one or more predetermined data items indicated in the aforementioned operation 208 and operation 210 may be one or more auxiliary scan response (AUX_SCAN_RSP) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, and one or more auxiliary scan response (AUX_SCAN_RSP) packets. Alternatively, the one or more predetermined data items indicated in the aforementioned operation 208 and operation 210 may be a group of packets formed by one or more auxiliary scan response (AUX_SCAN_RSP) packets and one or more auxiliary chain indication (AUX_CHAIN_IND) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, one or more auxiliary scan response (AUX_SCAN_RSP) packets, and one or more auxiliary chain indication (AUX_CHAIN_IND) packets.

In this situation, if the aforementioned predetermined receiving mode is the LE Extended Active Scan mode, then the first Bluetooth transmission circuit 121 and the second Bluetooth transmission circuit 131 may perform the operation 212 to receive the one or more predetermined data items transmitted from the audio playback device 110.

For yet another example, in some embodiments where the aforementioned predetermined transmitting mode is the Non-connectable mode, the Non-Scannable mode, the Periodic Advertising mode, the LE Extended Advertising mode, or the LE Periodic Advertising mode, the one or more predetermined data items indicated in the aforementioned operation 208 and operation 210 may be one or more auxiliary synchronous indication (AUX_SYNC_IND) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, and one or more auxiliary synchronous indication (AUX_SYNC_IND) packets.

In this situation, if the aforementioned predetermined receiving mode is the Periodic Scanning mode, then the first Bluetooth transmission circuit 121 and the second Bluetooth transmission circuit 131 may perform the operation 212 to receive the one or more predetermined data items transmitted from the audio playback device 110.

For yet another example, in some embodiments where the aforementioned predetermined transmitting mode is an advertising mode specified by the Bluetooth communication protocol of the Bluetooth Version 4.0, the one or more predetermined data items indicated in the aforementioned operation 208 and operation 210 may be one or more advertising indication (ADV_IND) packets, one or more non-connectable advertising indication (ADV_NONCONN_IND) packets, or one or more discoverable advertisement indication (ADV_DISCOVER_IND) packets. Alternatively, the one or more predetermined data items indicated in the aforementioned operation 208 and operation 210 may be a group of packets formed by one or more advertising indication (ADV_IND) packets and one or more non-connectable advertising indication (ADV_NONCONN_IND) packets. Alternatively, the one or more predetermined data items indicated in the aforementioned operation 208 and operation 210 may be a group of packets formed by one or more advertising indication (ADV_IND) packets and one or more discoverable advertisement indication (ADV_DISCOVER_IND) packets. Alternatively, the one or more predetermined data items indicated in the aforementioned operation 208 and operation 210 may be a group of packets formed by of one or more advertising indication (ADV_IND) packets, one or more non-connectable advertising indication (ADV_NONCONN_IND) packets, and one or more discoverable advertisement indication (ADV_DISCOVER_IND) packets.

In this situation, if the aforementioned predetermined receiving mode is a mode capable of receiving the aforementioned predetermined data items, then the first Bluetooth transmission circuit 121 and the second Bluetooth transmission circuit 131 may perform the operation 212 to receive the one or more predetermined data items transmitted from the audio playback device 110.

For yet another example, in some embodiments where the aforementioned predetermined transmitting mode is the Broadcast Isochronous Broadcasting mode or the Broadcast Isochronous Synchronization mode, the one or more predetermined data items indicated in the aforementioned operation 208 and operation 210 may be one or more BIS PDUs. Alternatively, the one or more predetermined data items indicated in the aforementioned operation 208 and operation 210 may be one or more BIG PDUs. Alternatively, the one or more predetermined data items indicated in the aforementioned operation 208 and operation 210 may be a group of PDUs formed by one or more BIS PDUs and one or more BIG PDUs.

In this situation, if the aforementioned predetermined receiving mode is an operation mode capable of receiving various PDUs through the BIS logical transports and/or capable of receiving various PDUs through the BIG logical transports, then the first Bluetooth transmission circuit 121 and the second Bluetooth transmission circuit 131 may perform the operation 212 to receive the one or more predetermined data items transmitted from the audio playback device 110.

It can be appreciated from the foregoing elaborations of the aforementioned operation 208, operation 210, and operation 212 that the first audio generating device 120 and the second audio generating device 130 can adopt the aforementioned various mechanisms to receive the Bluetooth audio transmission parameters sent by the audio playback device 110 without conducting the Bluetooth pairing procedure with the audio playback device 110.

Afterwards, the first audio generating device 120 may perform the operation 214, the operation 216, the operation 218, and the operation 220, and the second audio generating device 130 may perform the operation 222, the operation 224, the operation 226, and the operation 228.

In the operation 214, the first Bluetooth transmission circuit 121 may parse the received one or more predetermined data items to extract one or more Bluetooth audio transmission parameters. As can be appreciated from the foregoing descriptions, the Bluetooth audio transmission parameters extracted by the first Bluetooth transmission circuit 121 would comprise a predetermined indication data, a BIS interval, and the broadcasting timing corresponding to the first audio generating device 120 (e.g., the corresponding relationship between the identification data of the first audio generating device 120 and specific count values). In some embodiments, the Bluetooth audio transmission parameters extracted by the first Bluetooth transmission circuit 121 may further comprise the bandwidth allocated to the first audio generating device 120.

In operations, the first Bluetooth transmission circuit 121 is able to recognize that the audio playback device 110 is the device to be cooperated with the first audio generating device 120 according to the predetermined indication data. In some embodiments, the first Bluetooth transmission circuit 121 will proceed to the operation 216 only in the situation that the extracted Bluetooth audio transmission parameters comprises the aforementioned predetermined indication data.

In the operation 216, the first Bluetooth transmission circuit 121 may acquire an audio broadcasting timing data (hereinafter referred to as a first audio broadcasting timing data for the convenience of distinction) corresponding to the first audio generating device 120 according to the extracted one or more Bluetooth audio transmission parameters. For example, the first Bluetooth transmission circuit 121 may acquire a specific count value generated by the audio playback device 110 based on the broadcasting timing corresponding to the first audio generating device 120 (e.g., the corresponding relationship between the identification data of the first audio generating device 120 and the specific count value). The first Bluetooth transmission circuit 121 may convert the specific count value into a first count value related to a working clock of the first Bluetooth transmission circuit 121 to be the first audio broadcasting timing data corresponding to the first audio generating device 120.

In the operation 218, the first sound capturing circuit 123 may capture surrounding sounds to generate a corresponding first audio signal. For example, the first sound capturing circuit 123 may capture the voice of a first user located near the first audio generating device 120 to generate the corresponding first audio signal.

In the operation 220, the first audio conversion circuit 125 may generate one or more corresponding Bluetooth LE audio packets according to the first audio signal. For convenience of distinction, the Bluetooth LE audio packets generated by the first audio conversion circuit 125 are hereinafter referred to as first audio packets. In operations, the first audio conversion circuit 125 may utilize the Low Complexity Communication Codec (LC3) to encode the first audio signal, and insert the encoded audio data into one or more first audio packets. In practice, the first audio conversion circuit 125 may utilize other appropriate encoding approaches to encode the first audio signal.

In practice, the aforementioned operation 218 or operation 220 may be performed before the operation 214 or the operation 216, or may be performed at the same time as the aforementioned operation 214 or operation 216.

In the operation 222, the second Bluetooth transmission circuit 131 may parse the received one or more predetermined data items to extract one or more Bluetooth audio transmission parameters. As can be appreciated from the foregoing descriptions, the Bluetooth audio transmission parameters extracted by the second Bluetooth transmission circuit 131 would comprise a predetermined indication data, a BIS interval, and the broadcasting timing corresponding to the second audio generating device 130 (e.g., the corresponding relationship between the identification data of the second audio generating device 130 and specific count values). In some embodiments, the Bluetooth audio transmission parameters extracted by the second Bluetooth transmission circuit 131 may further comprise the bandwidth allocated to the second audio generating device 130.

In operations, the second Bluetooth transmission circuit 131 is able to recognize that the audio playback device 110 is the device to be cooperated with the second audio generating device 130 according to the predetermined indication data. In some embodiments, the second Bluetooth transmission circuit 131 will proceed to the operation 224 only in the situation that the extracted Bluetooth audio transmission parameters comprises the aforementioned predetermined indication data.

In the operation 224, the second Bluetooth transmission circuit 131 may acquire an audio broadcasting timing data (hereinafter referred to as a second audio broadcasting timing data for the convenience of distinction) corresponding to the second audio generating device 130 according to the extracted one or more Bluetooth audio transmission parameters. For example, the second Bluetooth transmission circuit 131 may acquire a specific count value generated by the audio playback device 110 based on the broadcasting timing corresponding to the second audio generating device 130 (e.g., the corresponding relationship between the identification data of the second audio generating device 130 and the specific count value). The second Bluetooth transmission circuit 131 may convert the specific count value into a second count value related to a working clock of the second Bluetooth transmission circuit 131 to be the second audio broadcasting timing data corresponding to the second audio generating device 130.

In the operation 226, the second sound capturing circuit 133 may capture surrounding sounds to generate a corresponding second audio signal. For example, the second sound capturing circuit 133 may capture the voice of a second user located near the second audio generating device 130 to generate the corresponding second audio signal.

In the operation 228, the second audio conversion circuit 135 may generate one or more corresponding Bluetooth LE audio packets according to the second audio signal. For convenience of distinction, the Bluetooth LE audio packets generated by the second audio conversion circuit 135 are hereinafter referred to as second audio packets. In operations, the second audio conversion circuit 135 may utilize the Low Complexity Communication Codec (LC3) to encode the second audio signal, and insert the encoded audio data into the one or more second audio packets. In practice, the second audio conversion circuit 135 may utilize other appropriate encoding approaches to encode the second audio signal.

In practice, the aforementioned operation 226 or operation 228 may be performed before the operation 222 or the operation 224, or may be performed at the same time as the aforementioned operation 222 or operation 224.

In the operation 230, the first audio generating device 120 and the second audio generating device 130 may respectively broadcast the generated audio packets through the BIS logical transport in turn at the time points corresponding to their own audio broadcasting timing data.

In operations, the first Bluetooth transmission circuit 121 may begin broadcast of the one or more first audio packets generated by the first audio conversion circuit 125 through a first BIS logical transport according to the aforementioned parameters (such as the BIS interval and/or bandwidth) at a time point corresponding to the first audio broadcasting timing data (i.e., a first time point corresponding to the first count value related to a working clock of the first Bluetooth transmission circuit 121). Similarly, the second Bluetooth transmission circuit 131 may begin broadcast of the one or more second audio packets generated by the second audio conversion circuit 135 through a second BIS logical transport according to the aforementioned parameters (such as the BIS interval and/or bandwidth) at a time point corresponding to the second audio broadcasting timing data (i.e., a second time point corresponding to the second count value related to a working clock of the second Bluetooth transmission circuit 131).

In practice, the aforementioned second BIS logical transport may be the same as the aforementioned first BIS logical transport, or may be different from the aforementioned first BIS logical transport.

The first audio generating device 120 and the second audio generating device 130 respectively broadcast their generated audio packets through the BIS logical transports, but the time point at which the first audio generating device 120 begins broadcast of the first audio packets (i.e., the aforementioned first time point) is different from the time point at which the second audio generating device 130 begins broadcast of the second audio packets (i.e., the aforementioned second time point).

As shown in FIG. 2, the first audio generating device 120 may repeat the operation 218, the operation 220, and the operation 230, so as to continuously capture the surrounding sounds, and generate and broadcast corresponding first audio packets. Similarly, the second audio generating device 130 may repeat the operation 226, the operation 228, and the operation 230, so as to continuously capture the surrounding sounds, and generate and broadcast corresponding second audio packets.

On the other hand, the audio playback device 110 may perform the operation 232 of FIG. 2 to receive the audio packets broadcasted from respective audio generating devices. In this embodiment, for example, the Bluetooth communication circuit 111 receives the first audio packets broadcasted from the first audio generating device 120 through the first BIS logical transport, and receives the second audio packets broadcasted from the second audio generating device 130 through the second BIS logical transport.

Please note that the time point at which the first audio generating device 120 begins the broadcast of the first audio packets is different from the time point at which the second audio generating device 130 begins the broadcast of the second audio packets. Therefore, the time point at which the Bluetooth communication circuit 111 receives the first audio packets is different from the time point at which the Bluetooth communication circuit 111 receives the second audio packets.

It can be appreciated from the foregoing elaborations of the operation 230 and the operation 232 that the audio playback device 110 can adopt the aforementioned mechanisms to receive the audio packets broadcasted by the first audio generating device 120 and the second audio generating device 130 without conducting the Bluetooth pairing procedure with both the first audio generating device 120 and the second audio generating device 130.

Then, the audio playback device 110 performs the operation 234 to generate and playback corresponding sounds based on received audio packets. In the operation 234, the control circuit 117 may parse the first audio packets received by the Bluetooth communication circuit 111 to acquire the corresponding first audio data, and may parse the second audio packets received by the Bluetooth communication circuit 111 to acquire the corresponding second audio data. In addition, the audio processing circuit 113 may process the first audio data and the second audio data (e.g., decoding the audio data and/or conducting format conversion) to generate a corresponding sound signal, and may control the audio playback circuit 115 to playback the sound signal generated by the audio processing circuit 113.

In other words, the audio processing circuit 113 may generate a corresponding sound signal based on the contents of the one or more first audio packets broadcasted from the first audio generating device 120 and the contents of the one or more second audio packets broadcasted from the second audio generating device 130, and may control the audio playback circuit 115 to playback the aforementioned sound signal.

It can be appreciated from the forgoing elaborations of FIG. 2, the first audio generating device 120 and the second audio generating device 130 of the Bluetooth audio system 100 share the sound playing function of the same audio playback device 110 in a manner similar to time-sharing, but the broadcasting timing and broadcast sequence of the first audio generating device 120 and the second audio generating device 130 are determined by the audio playback device 110 rather than by the first audio generating device 120 or the second audio generating device 130.

Additionally, the first audio generating device 120 and the second audio generating device 130 are enabled to adopt the aforementioned various mechanisms to receive the Bluetooth audio transmission parameters transmitted from the audio playback device 110, without conducting the Bluetooth pairing procedure with the audio playback device 110.

On the other hand, the audio playback device 110 is enabled to adopt the aforementioned mechanisms to receive the audio packets broadcasted by the first audio generating device 120 and the second audio generating device 130, without conducting the Bluetooth pairing procedure with the first audio generating device 120 and the second audio generating device 130.

Other audio generating devices in the Bluetooth audio system 100 (e.g., the aforementioned third audio generating device 140 and fourth audio generating device 150) may receive the Bluetooth audio transmission parameters transmitted from the audio playback device 110 according to the aforementioned approach adopted by the aforementioned first audio generating device 120 and second audio generating device 130. Similarly, the audio playback device 110 may receive the audio packets broadcasted by other audio generating devices (e.g., the aforementioned third audio generating device 140 and fourth audio generating device 150) according to the aforementioned approach. As a result, the user of the first audio generating device 120, the user of the second audio generating device 130, the user of the third audio generating device 140, and the user of the fourth audio generating device 150 can respectively emit sounds to their corresponding audio generating devices, so that the first audio generating device 120, the second audio generating device 130, the third audio generating device 140, and the fourth audio generating device 150 respectively generate and broadcast corresponding audio packets. On the other hand, the audio playback device 110 may receive the audio packets broadcasted by the first audio generating device 120, the second audio generating device 130, the third audio generating device 140, and the fourth audio generating device 150, and playback corresponding sounds.

In other words, by adopting the method of the foregoing FIG. 2, the Bluetooth audio system 100 can be utilized to realize various applications, such as multi-user real-time voice communications, multi-person teaching courses, multi-person instant chorus, or the like.

Additionally, since the user of the Bluetooth audio system 100 does not need to spend time in manually performing the Bluetooth pairing procedure between the audio playback device 110 and respective audio generating devices, it is apparent that the structure and operating approach of the disclosed Bluetooth audio system 100 can effectively improve the usage convenience and application flexibility of the Bluetooth audio system 100 in comparison with the manipulating approach of the traditional Bluetooth audio systems.

Furthermore, respective audio generating devices in the Bluetooth audio system 100 (e.g., the aforementioned first audio generating device 120, second audio generating device 130, third audio generating device 140, and fourth audio generating device 150) may adopt the BLE Audio technology to broadcast the audio packets, and respective audio generating devices may utilize the Low Complexity Communication Codec (LC3) to encode the audio signals. Therefore, in comparison with the traditional Bluetooth system, the aforementioned audio transmission approach adopted by the Bluetooth audio system 100 not only reduces the power consumption of the audio playback device 110 and individual audio generating devices to thereby extend the serving time of the audio playback device 110 and individual audio generating devices, but also effectively improves the overall audio quality of the audio playback device 110.

Please note that the structure of the disclosed Bluetooth audio system 100 is merely an exemplary embodiment, rather than a restriction to the practical implementations of the present disclosure. For example, the number of the audio generating devices in the Bluetooth audio system 100 can be increased or decreased according to practical application requirements, and is not restricted to the number shown in the foregoing embodiment.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A Bluetooth audio system (100) comprising:
an audio playback device (110) comprising:
an audio processing circuit (113) arranged to operably control an audio playback circuit (115);
a control circuit (117) coupled with the audio processing circuit (113) and arranged to operably generate one or more Bluetooth audio transmission parameters corresponding to an audio broadcasting timing indicator; and
a Bluetooth communication circuit (111) coupled with the control circuit (117) and arranged to operably transmit the one or more Bluetooth audio transmission parameters;
a first audio generating device (120) comprising:
a first sound capturing circuit (123) arranged to operably capture surrounding sounds to generate a corresponding first audio signal;
a first audio conversion circuit (125) coupled with the first sound capturing circuit (123) and arranged to operably generate corresponding one or more first audio packets according to the first audio signal; and
a first Bluetooth transmission circuit (121) coupled with the first audio conversion circuit (125) and arranged to operably receive the one or more Bluetooth audio transmission parameters when the first audio generating device (120) without conducting Bluetooth pairing with the audio playback device (110), and arranged to operably broadcast the one or more first audio packets through a BIS logical transport; and
a second audio generating device (130) comprising:
a second sound capturing circuit (133) arranged to operably capture surrounding sounds to generate a corresponding second audio signal;
a second audio conversion circuit (135) coupled with the second sound capturing circuit (133) and arranged to operably generate corresponding one or more second audio packets according to the second audio signal; and
a second Bluetooth transmission circuit (131) coupled with the second audio conversion circuit (135) and arranged to operably receive the one or more Bluetooth audio transmission parameters when the second audio generating device (130) without conducting Bluetooth pairing with the audio playback device (110), and arranged to operably broadcast the one or more second audio packets through a BIS logical transport;
wherein the Bluetooth communication circuit (111) is further arranged to operably receive the one or more first audio packets broadcasted by the first audio generating device (120), and to operably receive the one or more second audio packets broadcasted by the second audio generating device (130);
wherein the audio processing circuit (113) is further arranged to operably generate a corresponding sound signal according to contents of the one or more first audio packets and the one or more second audio packets, and to operably control the audio playback circuit (115) to playback the sound signal.

2. The Bluetooth audio system (100) of claim 1, wherein the control circuit (117) is further arranged to operably generate the audio broadcasting timing indicator according to an internal clock signal and a quantity of audio generating devices of the Bluetooth audio system (100);
wherein the first Bluetooth transmission circuit (121) is further arranged to operably acquire a first audio broadcasting timing data based on the one or more Bluetooth audio transmission parameters, and to operably begin broadcast of the one or more first audio packets at a first time point corresponding to the first audio broadcasting timing data;
wherein the second Bluetooth transmission circuit (131) is further arranged to operably acquire a second audio broadcasting timing data based on the one or more Bluetooth audio transmission parameters, and to operably begin broadcast of the one or more second audio packets at a second time point corresponding to the second audio broadcasting timing data.

3. The Bluetooth audio system (100) of claim 2, wherein the control circuit (117) is further arranged to operably insert the one or more Bluetooth audio transmission parameters into the one or more predetermined data items, and to operably utilize the Bluetooth communication circuit (111) to transmit the one or more predetermined data items;
wherein the first Bluetooth transmission circuit (121) is further arranged to operably receive the one or more predetermined data items, and to operably parse the one or more predetermined data items to extract the one or more Bluetooth audio transmission parameters;
wherein the second Bluetooth transmission circuit (131) is further arranged to operably receive the one or more predetermined data items, and to operably parse the one or more predetermined data items to extract the one or more Bluetooth audio transmission parameters.

4. The Bluetooth audio system (100) of claim 3, wherein the one or more predetermined data items are selected from a group consisting of following items:
one or more advertising indication (ADV_IND) packets;
one or more non-connectable advertising indication (ADV_NONCONN_IND) packets;
one or more discoverable advertisement indication (ADV_DISCOVER_IND) packets;
one or more BIS protocol data units; and
one or more BIG protocol data units.

5. The Bluetooth audio system (100) of claim 3, wherein the one or more predetermined data items are selected from a group consisting of following items:
one or more auxiliary advertising indication (AUX_ADV_IND) packets;
one or more extended advertising indication (ADV_EXT_IND) packets;
one or more advertising decision indication (ADV_DECISION_IND) packets;
one or more auxiliary chain indication (AUX_CHAIN_IND) packets;
one or more auxiliary scan response (AUX_SCAN_RSP) packets;
one or more auxiliary synchronous indication (AUX_SYNC_IND) packets;
one or more BIS protocol data units; and
one or more BIG protocol data units.

6. The Bluetooth audio system (100) of claim 3, wherein the one or more predetermined data items are selected from a group consisting of following items:
one or more advertising indication packets;
one or more non-connectable advertising indication packets;
one or more discoverable advertisement indication packets;
one or more auxiliary advertising indication packets;
one or more extended advertising indication packets;
one or more advertising decision indication packets;
one or more auxiliary chain indication packets;
one or more auxiliary scan response packets;
one or more auxiliary synchronous indication packets;
one or more BIS protocol data units; and
one or more BIG protocol data units.

7. An audio playback device (110) of a Bluetooth audio system (100), wherein the Bluetooth audio system (100) comprising a first audio generating device (120) and a second audio generating device (130), the audio playback device (110) comprising:
an audio processing circuit (113) arranged to operably control an audio playback circuit (115);
a control circuit (117) coupled with the audio processing circuit (113) and arranged to operably generate one or more Bluetooth audio transmission parameters corresponding to an audio broadcasting timing indicator; and
a Bluetooth communication circuit (111) coupled with the control circuit (117) and arranged to operably transmit the one or more Bluetooth audio transmission parameters;
wherein the first audio generating device (120) captures surrounding sounds to generate a corresponding first audio signal, generates corresponding one or more first audio packets according to the first audio signal, and receives the one or more Bluetooth audio transmission parameters when the first audio generating device (120) without conducting Bluetooth pairing with the audio playback device (110), and broadcasts the one or more first audio packets through a BIS logical transport;
wherein the second audio generating device (130) captures surrounding sounds to generate a corresponding second audio signal, generates corresponding one or more second audio packets according to the second audio signal, and receives the one or more Bluetooth audio transmission parameters when the second audio generating device (130) without conducting Bluetooth pairing with the audio playback device (110), and broadcasts the one or more second audio packets through a BIS logical transport;
wherein the Bluetooth communication circuit (111) is further arranged to operably receive the one or more first audio packets broadcasted by the first audio generating device (120), and to operably receive the one or more second audio packets broadcasted by the second audio generating device (130);
wherein the audio processing circuit (113) is further arranged to operably generate a corresponding sound signal according to contents of the one or more first audio packets and the one or more second audio packets, and to operably control the audio playback circuit (115) to playback the sound signal.

8. The audio playback device (110) of claim 7, wherein the control circuit (117) is further arranged to operably generate the audio broadcasting timing indicator according to an internal clock signal and a quantity of audio generating devices of the Bluetooth audio system (100);
  wherein the first audio generating device (120) acquires a first audio broadcasting timing data based on the one or more Bluetooth audio transmission parameters, and begins broadcast of the one or more first audio packets at a first time point corresponding to the first audio broadcasting timing data;
  wherein the second audio generating device (130) acquires a second audio broadcasting timing data based on the one or more Bluetooth audio transmission parameters, and begins broadcast of the one or more second audio packets at a second time point corresponding to the second audio broadcasting timing data.

9. The audio playback device (110) of claim 8, wherein the control circuit (117) is further arranged to operably insert the one or more Bluetooth audio transmission parameters into the one or more predetermined data items, and to operably utilize the Bluetooth communication circuit (111) to transmit the one or more predetermined data items when the control circuit (117) without conducting Bluetooth pairing with the first audio generating device (120) and the second audio generating device (130);
  wherein the first audio generating device (120) receives the one or more predetermined data items, and operably parses the one or more predetermined data items to extract the one or more Bluetooth audio transmission parameters;
  wherein the second audio generating device (130) receives the one or more predetermined data items, and operably parses the one or more predetermined data items to extract the one or more Bluetooth audio transmission parameters.

10. The audio playback device (110) of claim 9, wherein the one or more predetermined data items are selected from a group consisting of following items:
  one or more advertising indication (ADV_IND) packets;
  one or more non-connectable advertising indication (ADV_NONCONN_IND) packets;
  one or more discoverable advertisement indication (ADV_DISCOVER_IND) packets;
  one or more BIS protocol data units; and
  one or more BIG protocol data units.

11. The audio playback device (110) of claim 9, wherein the one or more predetermined data items are selected from a group consisting of following items:
  one or more auxiliary advertising indication (AUX_ADV_IND) packets;
  one or more extended advertising indication (ADV_EXT_IND) packets;
  one or more advertising decision indication (ADV_DECISION_IND) packets;
  one or more auxiliary chain indication (AUX_CHAIN_IND) packets;
  one or more auxiliary scan response (AUX_SCAN_RSP) packets;
  one or more auxiliary synchronous indication (AUX_SYNC_IND) packets;
  one or more BIS protocol data units; and
  one or more BIG protocol data units.

12. The audio playback device (110) of claim 9, wherein the one or more predetermined data items are selected from a group consisting of following items:
  one or more advertising indication packets;
  one or more non-connectable advertising indication packets;
  one or more discoverable advertisement indication packets;
  one or more auxiliary advertising indication packets;
  one or more extended advertising indication packets;
  one or more advertising decision indication packets;
  one or more auxiliary chain indication packets;
  one or more auxiliary scan response packets;
  one or more auxiliary synchronous indication packets;
  one or more BIS protocol data units; and
  one or more BIG protocol data units.

* * * * *